United States Patent
Stirner et al.

[15] 3,688,074
[45] Aug. 29, 1972

[54] ELECTRODE WEAR COMPENSATING APPARATUS FOR AN ELECTRICAL DISCHARGE MACHINE

[72] Inventors: Kurt Stirner, Churchville; Allen Berger, Wayne, both of Pa.

[73] Assignee: Jade Corporation, Huntingdon Valley, Pa.

[22] Filed: July 12, 1971

[21] Appl. No.: 161,812

[52] U.S. Cl. ............................219/69 G, 219/69 V
[51] Int. Cl. ...................................B23p 1/08
[58] Field of Search...........................219/69 G, 69 V

[56] References Cited

UNITED STATES PATENTS 3,125,700   3/1964   Bentley et al............219/69 G
3,462,576   8/1969   Ellis........................219/69 V Primary Examiner—R. F. Staubly
Attorney—Arthur H. Seidel et al.

[57] ABSTRACT

Apparatus for compensating the electrode wear in an electric discharge machine tool wherein an end of electrode travel signal is generated by actuation of a limit switch. The limit switch is actuated by a lead screw which is physically connected to the electrode holding means. The lead screw is moved a predetermined distance away from the limit switch by a motor means on each operation of the electrical discharge machine (EDM).

11 Claims, 4 Drawing Figures

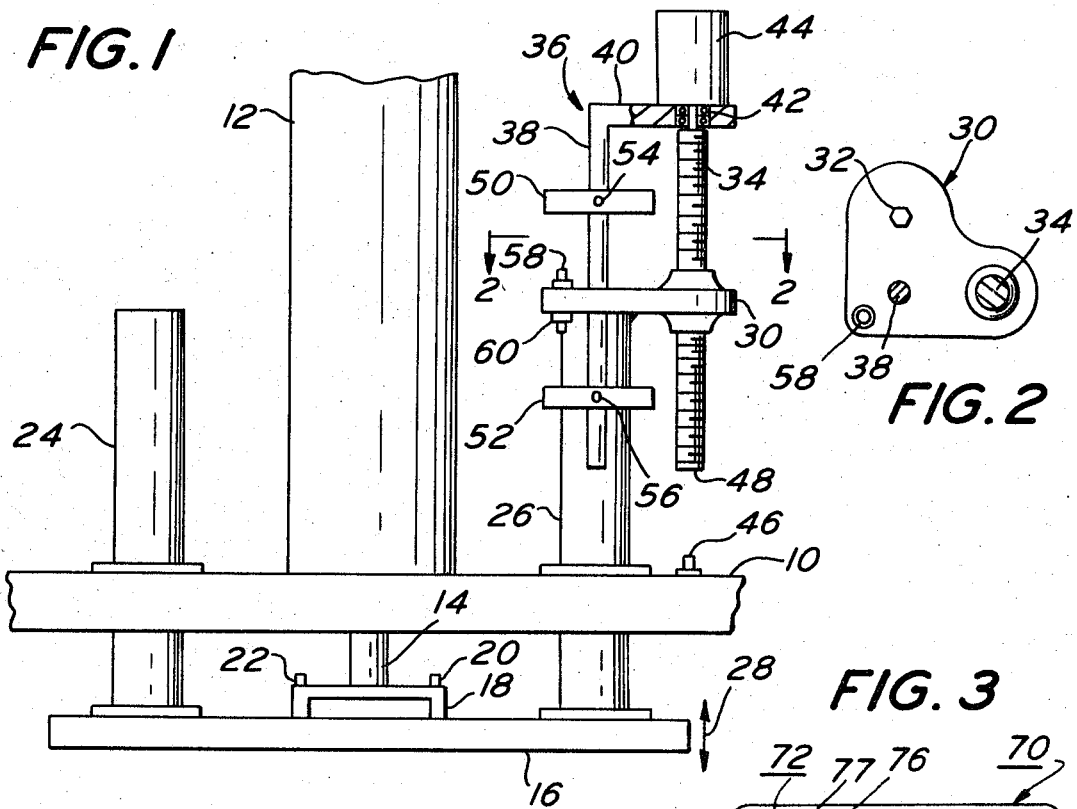
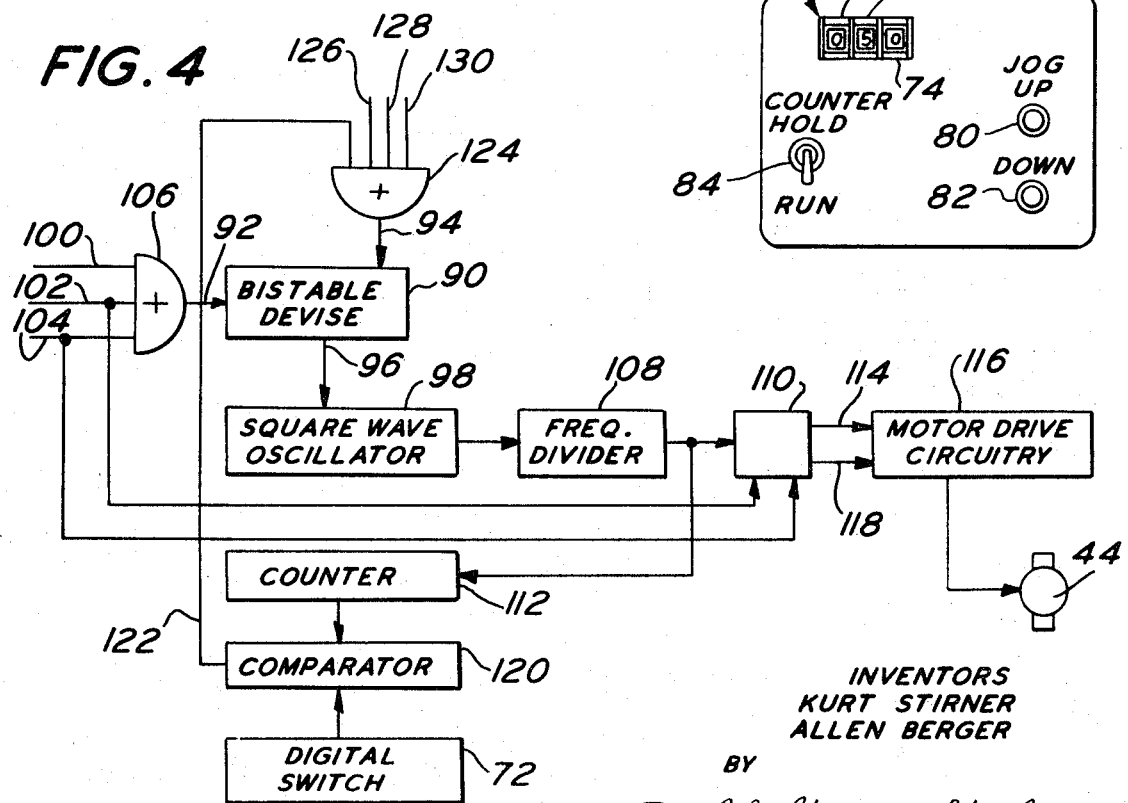

ELECTRODE WEAR COMPENSATING APPARATUS FOR AN ELECTRICAL DISCHARGE MACHINE

This invention relates to compensating apparatus for electrode wear in an electrical discharge machine tool. More particularly, the present invention relates to apparatus which allows the electrode holding means to be advanced a predetermined distance farther on each successive operation of the electrical discharge machine thereby compensating for the wear or shortening of the electrodes.

Electrical discharge machining, or EDM, is a method of machining electrical current conducting materials, particularly metals, by utilizing the energy from an electrical discharge from an electrode to erode away the work piece being machined. During the EDM process, the electrode is gradually worn or consumed. The amount of electrode wear depends upon the type of materials being machined. The amount of electrode wear per work piece may be relatively constant in a production machining operation. That is, where successive work pieces of the same type of material are eroded or machined to the same configuration, the amount of electrode wear per work piece will be relatively constant.

Although the electrode wear per work piece in a production machining operation may be relatively constant, machine operators in the past were required to make a manual adjustment for each new work piece. The total time in a day for an operator to make these adjustments for each work piece was substantial. During the time that an operator is adjusting the machine, the machine is not producing finished work pieces. In summary, the manual adjustment of the machine in the past was tedious, inefficient and costly in terms of lost production. The tedious measurement for each work piece also resulted in a significant number of errors.

The present invention overcomes these problems. By using the present invention, the operator is required to make only an initial reading of the electrode wear on the first work piece. The operator may then set his reading of electrode wear into a digital switch. The present invention then automatically compensates for electrode wear or consumption for all successive work pieces by enabling the electrode holding means to advance by the distance set in by the operator on each successive operation.

In EDM apparatus of the type to which the invention is applicable, the electrode holding means and the electrodes held therein are advanced toward the work piece by a servo motor means. An end of travel signal to stop the servo motor means driving the electrode holding means is generated by a trip member contacting a limit switch. The trip member physically moves with the electrode holding means. Briefly stated, the essence of this invention is to have a lead screw, which is retracted by a predetermined amount on each operation of the machine, operate the limit switch. The lead screw is mounted through a mounting means which is mounted to move with the electrode holding means. The lead screw may be retracted by a suitable motor means such as a stepper motor. The motor means to retract the lead screw by a predetermined amount may be energized by an oscillator through motor drive circuitry. The oscillator may be energized each time the limit switch is contacted by a lead screw. The oscillator remains energized until a predetermined number of oscillations or pulses are counted in a counter means. A comparator means which receives an input from a digital switch may be used to detect a predetermined count in the counter means and de-energize the oscillator. Additional members and limit switches are provides to limit the compensating adjustment for electrode wear to predetermined amounts.

For the purpose of illustrating the invention, there are shown in the drawings forms which are presently preferred; it being understood, however, that this invention is not limited to the precise arrangements and instrumentalities shown.

FIG. 1 is an elevation view, partly in cross section, of a portion of an electrical discharge machine incorporating an embodiment of the present invention.

FIG. 2 is a view, partly in cross section, taken along the line 2—2 of FIG. 1.

FIG. 3 is an elevation view of a control panel of the present invention.

FIG. 4 is a schematic diagram in block diagram form of the present invention.

Referring now to the drawings in detail, wherein like numerals indicate like elements, there is shown in FIG. 1 portions of an electric discharge machine having a base member 10. A frame 12 is mounted on base member 10. The frame 12 may contain servo motor means (not shown) which are well known in the prior art for driving ram 14. Electrode holding member 16 is physically connected to ram 14 through connecting member 18 by means of bolts 20 and 22, or any other suitable fastening means well known in the art.

Guide members 24 and 26 are slidably mounted through base 10 and physically connected to electrode holding member 16 by any suitable means well known in the art. Electrode holding member 16 may be provided with electrodes (not shown) extending vertically downward from electrode holding member 16. The electrode holding member 16 carrying the electrodes (not shown) moves vertically in the directions shown by arrow 28 in order for the electrodes to engage a work piece (not shown) located in a dielectric liquid medium contained in a tank (not shown) as is well known in the art.

Mounting member 30 is mounted on the upper end of guide member 26. Mounting member 30 is more clearly shown in FIG. 2. As may be more clearly understood by taking FIG. 2 in connection with FIG. 1, mounting member 30 may be physically mounted on the upper end of guide member 26 by means of a bolt 32 although any other suitable fastening means such as welding may be employed. Lead screw 34 is threadedly mounted through mounting member 30. L-shaped member 36 has its longer leg 38 slidably mounted through mounting member 30. The shorter leg 40 of L-shaped member 36 has the upper end of lead screw 34 rotatably mounted through it by means of ball bearings 42 as may be seen in the broken-out section of the shorter leg 40 of L-shaped member 36. A motor 44 which may preferably be a stepper motor is securely mounted to the shorter leg 40 of L-shaped member 36 by any suitable means such as bolts (not shown). Although L-shaped member 36 is shown as being formed as a unitary element, it is understood that the bolting together of two elements such as the shorter leg 40 and the longer leg 38 would be an equivalent.

A limit switch 46 is mounted on base member 10. Limit switch 46 is cooperatively engaged by the lower end 48 of lead screw 34 during the downward travel of electrode holding member 16 and guide member 26. Limit switch 46 creates an end of travel signal which stops the motor (not shown) driving ram 14. As may be seen from FIG. 1, rotation of lead screw 34 in a counterclockwise direction by motor 44 causes lead screw 34 to move in an upward direction with respect to mounting member 30 or in other words to be retracted. This retraction or upward movement of lead screw 34 with respect to mounting member 30 allows guide member 26 and electrode holding member 16 to travel farther in a downward direction before limit switch 46 is contacted. Therefore, a predetermined amount of rotation in a counterclockwise direction by motor 44 causes lead screw 34 to be retracted from mounting member 30 and provides a predetermined increment of farther downward travel or advance.

Members 50 and 52 are mounted on longer leg 38 of L-shaped member 36 by thumbscrews 54 and 56, respectively. Limit switches 58 and 60 are mounted on the upper and lower sides of mounting member 30, respectively. Member 50 contacts limit switch 58 and prevents further energization of motor 44 when lead screw 34 has been sufficiently rotated in a clockwise direction. That is, limit switch 58 is engaged by member 50 so when lead screw 34 has been screwed down through mounting member 30. Limit switch 60 will be engaged by member 52 when lead screw 34 has been retracted or screwed up through mounting member 30 after a number of operations of the electrical discharge machine. In normal operation, member 52 will be adjusted by thumbscrew 56 on the longer leg 38 of L-shaped member 36 so as to prevent further downward adjustment of electrode holding member 16 when the electrodes have been worn down to their minimum usable length.

It is to be understood that the mounting of the various limit switches may be varied within the scope of the invention and perform their function equally well. For example, the limit switch 46 may be mounted on end 48 of lead screw 34. In such a case limit switch 46 would be engaged by contacting base 10. The limit switch 58 may be mounted equally well on member 50. The limit switch 58 in such a case would be engaged by contacting mounting member 30. Similarly, limit switch 60 could be mounted on member 52.

Referring now to FIG. 3, there is shown a control panel 70 used in setting up the compensating apparatus of the present invention. A digit switch 72 is provided which may be of the thumb switch type. Thumb switch 72 has a unit section 74, a tenths section 76 and a hundreths section 77. In a preferred embodiment of this invention, any number between 000 and 999 may be set into digital switch 72 corresponding to an advance per operation of electrode holding member 16 of zero thousandths of an inch to 999 thousandths of an inch. The number dialed into digit switch 72 by the operator is determined from a measurement of the number of thousandths of an inch of electrode wear on the first work piece.

A push button 80 is provided on control panel 70 for manual jog up operation of lead screw 34 which may be necessary in initial set up operation. Push button 82 is provided for jog down operation of lead screw 34 during a set up operation. That is, push buttons 80 and 82 are used to manually energize motor 44, overriding the setting on digital switch 72, to cause lead screw 34 to rotate and be driven either up or down with respect to mounting member 30. A switch 84 is provided to prevent motor 44 from operating when switch 84 is in the hold position. The run position of switch 84 is the normal operating position. During a set up condition, operation of motor 44 may be prevented by placing switch 84 in the hold condition even though end 48 of lead screw 34 is in contact with limit switch 46.

Referring now to FIG. 4, a schematic diagram partially in block diagram form, of the control circuitry of the present invention is shown. A bi-stable device 90 which may be a flip-flop is provided. Bi-stable device 90 has a set input 92 and a reset input 94. Output 96 of bi-stable device 90 enables energization of square wave oscillator 98 when bi-stable device 90 is in a set condition. Input 92 of bi-stable device 90 is provided with a set signal when any one of the inputs 100, 102 or 104 of OR gate 106 is provided with a signal. Input terminal 100 of OR gate 106 is provided with a signal each time end 48 of lead screw 34 engages limit switch 46. Input leads 102 and 104 of OR gate 106 receive an input signal when push buttons 80 and 82, respectively, are depressed.

The output of square wave oscillator 98 is fed to frequency divider 108. Frequency divider 108 is used to coordinate the pitch of the threads of lead screw 34 with the steps per revolution of stepper motor 44 so that the setting on digit switch 72 is read directly in thousandths of an inch. The output of frequency divider 108 is fed to switching circuit 110 and counter 112. Switching circuit 110 provides output pulses by an output line 114 whenever a signal is present on input leads 100 or 102 of OR gate 106. Pulses on line 114 cause motor drive circuitry 116 to drive stepper motor 44 in a counterclockwise direction causing lead screw 34 to be retracted or screwed up through mounting member 30. Pulses are provided on line 118 when a signal is present on input 104 of OR gate 106. When pulses are present on line 118, motor drive circuitry 116 causes stepper motor 44 to rotate in a clockwise direction thereby causing lead screw 34 to be screwed down through mounting member 30. The count of counter 12 is compared in comparator 120 with the setting on digital switch 72. When coincidence is detected by comparator 120, an output signal is generated on line 122 causing bi-stable device 90 to be reset through OR gate 124. The resetting of bi-stable device 90 causes square wave oscillator 98 to cease oscillation. Therefore, square wave oscillator 98 will oscillate only until stepper motor 44 has caused lead screw 34 to retract by a predetermined distance determined by the setting on digital switch 72. Inputs 126, 128 and 130 are fed respectively with signals from upper limit switch 58, lower limit switch 60 and switch 84 in the hold position in order to prevent oscillation of square wave oscillator 98 during the various conditions.

In operation, members 50 and 52 would be adjusted a predetermined distance apart on longer leg 38 of L-shaped member 36 depending upon the usable portion of electrodes being employed. After operation on the first work piece, a measurement of electrode wear would be made. This electrode wear measurement would be set into digital switch 72 expressed in thousandths of an inch. Jog down button 82 would be depressed until lead screw 34 was screwed down through mounting member 30 until member 50 contacted limit switch 58. The machine would then be set up for operation. Each time end 48 of lead screw 34 contacted limit switch 46, a signal would be felt on input terminal 100 of OR gate 106 thereby energizing square wave oscillator 98. Assuming as an example that the electrode wear measurement on the first piece was 50 thousandths of an inch and that 050 was set in to digital switch 72, square wave oscillator 98 would oscillate until comparator 120 detected a count of fifty in counter 112. Comparator 120 via line 122 and OR gate 124 would reset bi-stable device 90 thereby turning off square wave oscillator 98. This predetermined period of oscillation of square wave oscillator 98 would have caused lead screw 34 to have been retracted by fifty thousandths of an inch and would therefore allow electrode holding member 16 to advance fifty thousandths of an inch farther on the next operation. Thus, electrode holding member 16 would be advanced fifty thousandths of an inch farther on each successive operation of the electric discharge machine until member 52 contacted limit switch 60. At this time, new electrodes would be required.

It will be apparent to those skilled in the art that the wear compensating apparatus described herein may be used for compensating for wear in various types of cutting and erosion machinery. It is also apparent that various changes and modifications may be made in the circuitry, or different devices used to produce the same function in the circuit. For example, the limit switches may be mounted in other positions as discussed above. A rack and pinion may be provided in place of the axially driven lead screw 34. Mounting means 30 and hold compensating apparatus need not be mounted on top of guide member 26, but may be mounted in any suitable manner so long as its physical movement is tied to the physical movement of electrode holding member 16. With respect to the circuitry, frequency divider 108 could be eliminated by providing an adjustable square wave oscillator. Further, it is not necessary that a square wave oscillator be used, any suitable oscillator may be provided, such as a sine wave oscillator.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. Apparatus for compensating for a decrease in length of an electrode in an electrical discharge machine wherein said electrode carried by an electrode holding means is reciprocably mounted to advance into and retract out of engagement with a work piece, comprising:
 a limit switch;
 a lead screw mounted to engage said limit switch when said electrode holding means advances into engagement with the work piece;
 motor means for moving said lead screw in a direction away from said limit switch; and
 control means for energizing said motor means to move said lead screw in a direction away from said limit switch by a predetermined distance each time said lead screw engages said limit switch.

2. Apparatus for compensating for a decrease in length of an electrode in an electrical discharge machine wherein said electrode carried by an electrode holding means is reciprocably mounted to advance into and retract out of engagement with a work piece, comprising:
 a lead screw threadably mounted through said mounting member;
 motor means for rotating said lead screw;
 a limit switch stationarily mounted to be engaged by one end of said lead screw when said electrode holding means approaches its most advanced position; and
 control means for energizing said motor means to rotate said lead screw by a predetermined amount each time said end of said lead screw contacts said limit switch thereby allowing said electrode holding means to advance a predetermined distance on the next operation.

3. Apparatus for compensating for a decrease in length of an electrode as recited in claim 2 wherein said motor means is a stepper motor.

4. Apparatus for compensating for a decrease in length of an electrode as recited in claim 3 wherein said control means comprises:
 oscillator means for generating pulses;
 means for energizing said oscillator means when said end of said lead screw engages said limit switch;
 motor drive means for receiving the pulses generated by said oscillator means and driving said stepper motor in response to said pulses; and
 means for counting the pulses generated by said oscillator means and for de-energizing said oscillator means when a predetermined number of pulses is counted.

5. Apparatus for compensating for a decrease in length of a consumable electrode in an electrical discharge machine having a base and an electrode carried by a holding means reciprocably mounted to advance into and retract out of engagement with a work piece, a guide member having a first and a second end, said guide member mounted at said first end to said holding means and slidably mounted through said base, comprising:
 a mounting member mounted on said second end of said guide member;
 a lead screw threadably mounted through said mounting member;
 an L-shaped member, the longer leg of said L-shaped member being slidably mounted through said mounting member and substantially parallel to said lead screw, said lead screw being rotatably mounted to the shorter leg of said L-shaped member with said L-shaped member constrained to follow axial movement of said lead screw, said L-shaped member slidably moving through said mounting member in response to movement of said lead screw;
 motor means for rotating said lead screw;
 a first limit switch mounted on said base, one end of said lead screw engaging said first limit switch when said holding means approaches its most advanced position; and control means for energizing said motor means to rotate said lead screw by a predetermined amount each time said end of said lead screw engages said first limit switch thereby allowing said holding means to be advanced a predetermined distance on the next operation.

6. Apparatus for compensating for a decrease in length of an electrode as recited in claim 5 including:

a first and a second member mounted a predetermined distance apart on said longer leg of said L-shaped member; and a second and a third limit switch mounted along the path of said longer leg of said L-shaped member, said second and said third limit switches being engaged by said first and said second members, respectively, to prevent advance and retraction of said holding means beyond predetermined limits.

7. Apparatus for compensating for a decrease in length of an electrode as recited in claim 6 wherein the position of at least one of said first and second members on said longer leg of said L-shaped member may be adjusted.

8. Apparatus for compensating for a decrease in length of an electrode as recited in claim 5 wherein said motor means is a stepper motor.

9. Apparatus for compensating for a decrease in length of an electrode as recited in claim 8 wherein said control means comprises:

oscillator means for generating pulses;

means for energizing said oscillator means when said end of said lead screw engages said first limit switch;

motor drive means for receiving the pulses generated by said oscillator means and driving said stepper motor in response to said pulses; and means for counting the pulses generated by said oscillator means and for de-energizing said oscillator means when a predetermined number of pulses is counted.

10. Apparatus for compensating for a decrease in length of an electrode as recited in claim 9 wherein said counting means includes a digital switch to vary the predetermined number to which said counting means will count before de-energizing said oscillator means.

11. Apparatus for compensating for a decrease in length of an electrode as recited in claim 10 wherein said oscillator means includes a frequency divider.

* * * * *